3,279,916
DISPERSION HARDENED WROUGHT URANIUM

Allan S. Bufferd, Watertown, and Nicholas J. Grant, Winchester, Mass., and Klaus M. Zwilsky, Hamden, Conn., assignors to New England Materials Laboratory, Inc., Medford, Mass., a corporation of Massachusetts
No Drawing. Filed Aug. 16, 1963, Ser. No. 302,725
6 Claims. (Cl. 75—206)

This invention relates to a method for producing a dispersion hardened wrought uranium product and more particularly to a method for dispersion hardening uranium metal with refractory oxides having a low neutron cross section. The invention described herein was made in the course of, or under, a contract with the U.S. Atomic Energy Commission.

Irradiation behavior of metallic uranium fuel elements has shown the need for improvement in properties to obtain higher resistance to volume instability at elevated temperatures. Fission gases formed in irradiated uranium base elements are capable of exerting considerable pressure at elevated temperatures. This pressure can exceed the creep strength of the surrounding matrix and lead to dimensional changes and catastrophic swelling. Severe circumferential tensile stresses can also be caused by the large radial thermal gradients existing in a fuel rod.

Because uranium can exist in three separate phases, for example alpha, beta and gamma, depending on the particular range of temperature applied, severe stresses may be set up within the fuel rod which may exceed the creep strength of the surrounding matrix. For example, under normal reactor operating conditions, alpha and beta phases may exist simultaneously in the metal such that the beta phase may form in the core and the alpha phase at the skin. Where such conditions prevail, the increase in volume engendered by the transformation of alpha into beta in the core subjects the skin of the fuel rod to severe hoop stresses resulting in eventual failure of the skin by cracking.

With conventional metal fuels, it is usually necessary to limit the maximum exposure of the fuel to temperatures of approximately 500° C. or, if long time exposure is desired, to operate at lower temperatures. It was postulated that a metal-metal oxide type wrought uranium fuel element would give improved performance at a temperature of 500° C. or higher by minimizing internal cracking and increasing the restraint to fusion gas bubble growth. In addition, the dispersed phase may act as a nucleating site for the fission gas, thus having the effect of dispersing the bubbles evenly throughout the matrix.

It is known to produce metal-metal oxide dispersion hardened materials by mixing a finely divided stable refractory oxide powder with a finely divided matrix metal and extruding the mixture to a wrought metal shape. However, this method applied to uranium powder has the disadvantage in that, in addition to the refractory oxide which is added to the powder, the uranium metal itself tends to form an oxide because of oxygen contamination in the system, whereby stringering and fibering occurs in the final product due to the presence of $UO_2$.

Uranium hydride appeared to offer one method of approach; first, because through decomposition it provides its own reducing and protective atmosphere and, secondly, because upon decomposition it provides a smaller particle size of matrix metal which is desirable. In one attempt to use uranium hydride, about 1.5 pounds of the powder of particle size not exceeding about 14 microns in size was dehydrided by heating in a vacuum furnace to 800° F. and holding for several hours at below 100 microns pressure, vacuum compacted and then hydrostatically pressed at 30,000 p.s.i. The pressed dehydrided powder was then sintered at 1100° F. for 15 hours in a 50 micron vacuum and the resulting billet of about 1⅝ inches in diameter and 1¾ inches long was vacuum sealed in a copper can and the canned billet extruded at 1150° F. at an extrusion ratio of about 26 to 1.

Metallographic examination of the extrusion, however, indicated a coarse-grained structure and heavy oxide stringering throughout comprising $UO_2$ in amounts ranging from about 20 to 30 volume percent, this despite the fact that the hydride powder was handled during the early stages of processing in a dry box in the presence of an atmosphere of argon. Thus, the effect of any refractory oxide powder added to the uranium hydride powder would not be realized to its fullest in view of the formation of $UO_2$. Apparently, the uranium metal formed by decomposition of the hydride is extremely active and a very strong getter for oxygen.

It would be desirable, therefore, if a method could be provided for producing dispersion hardened uranium in which the formation of $UO_2$ is greatly minimized, for example maintained to below 5 v/o.

It is thus an object to provide a dispersion hardened uranium alloy characterized by improved physical properties at elevated temperatures and, in particular, improved resistance to creep.

Another object is to provide a method of producing a dispersion hardened wrought uranium product in which the dispersed refractory oxide phase has a low neutron cross section.

A further object is to provide a dispersion hardened uranium metal by utilizing finely divided uranium hydride as the source of matrix metal.

These and other objects will more clearly appear from the following disclosure and the appended claims.

We find that we can produce dispersion hardened uranium having improved high temperature properties while minimizing the formation of $UO_2$ by utilizing the following steps: providing a substantially uniform mixture of finely divided uranium hydride powder and about 1 to 15 v/o of refractory oxide powder derived from a metal having a low microscopic thermal neutron cross section not exceeding about 125 barns and characterized by a negative free energy of formation of said oxide at about 25° C. of over 95,000 calories per gram atom of oxygen and an average particle size not exceeding about 0.3 micron, cold compressing said mixture into a porous billet capable of being handled in subsequent metallurgical operations, dehydriding the billet at an elevated dehydriding temperature under protective conditions until substantially all of the hydride has been decomposed and substantially all of the hydrogen has been removed, vacuum sealing the dehydrided billet in a deformable metal container, and then hot working the vacuum sealed container at an elevated hot working temperature.

It is preferred in producing the powder mixture that the uranium hydride have a particle size not exceeding about 15 microns and, preferably, not exceeding about 10 microns. In its most preferred aspect, the average particles within the foregoing ranges should not exceed about 5 microns. Generally, the hydride upon decomposition undergoes a further refinement in particle size, whereby a highly active finely divided uranium powder is obtained.

The particle size of the refractory oxide powder is preferably controlled over the range of 0.01 to 0.1 micron and, more preferably, 0.01 to 0.05 micron. Examples of refractory oxides having a negative free energy of formation exceeding 95,000 calories per gram atom of oxygen at about 25° C. include $SiO_2$ (about 96,200), $Al_2O_3$ (about 125,590), $MgO$ (about 136,130) and $BeO$ (about 139,000). Other refractory oxides which may be employed are $TiO_2$, $ZrO_2$, $CeO_2$, CaO, BaO, SrO, $ThO_2$, etc. The foregoing refractory oxides are further characterized by a low microscopic neutron cross section of below 125 barns. While the foregoing oxides may be employed over the range of about 1 to 15 v/o, we prefer a range of about 3 to 15 v/o and, more preferably, about 3 to 10 v/o. It is preferred that the relationship between the amount of refractory oxide, its particle size and the particle size of the matrix metal powder be such that the average interparticle spacing of the oxide particles not exceed 1 micron and preferably be maintained below 0.5 micron. For example, we prefer the average interparticle spacing fall within the range of about 0.02 to 0.5 micron. In insuring substantially uniform spacing, we prefer that the average particle size of the refractory oxide particles over the various composition ranges indicated above be 30 to 250 times smaller than that of the average size of the matrix powder and, preferably, 30 to 150 times smaller.

In producing dispersion hardened uranium in accordance with the invention using alumina as the disperse phase, the following materials were employed: uranium hydride prepared by the Sylvania-Corning Nuclear Corporation containing about 540 to 570 p.p.m. (parts per million) of oxygen as determined by vacuum fusion, and gamma alumina having an average particle size of about 0.027 micron known by the designation Alon C having a purity of better than 99% obtained from G. L. Cabot, Inc. The oxygen content of the hydride powder should be as low as is possible and the corresponding volume percent of $UO_2$ should not exceed 5 v/o. An oxygen content of up to about 2500 p.p.m. corresponds to about 3.6 v/o $UO_2$. The uranium hydride powder employed had the following size distribution:

| Size: | Percent |
|---|---|
| <1µ | 10 |
| 1–2µ | 40 |
| 2–4µ | 30 |
| 4–14µ | 20 |

The foregoing size distribution corresponds to an average particle size of between 3 to 4 microns. While, as stated hereinbefore, the particle size may range up to about 15 microns, we prefer it not exceed about 10 microns.

Composition batches containing 3.5 v/o and 7.5 v/o of gamma alumina are produced by mixing the powders inside a dry box in an atmosphere of argon. In producing the mixture containing 3.5 v/o alumina, four separate batches are made having a total weight of about 770 grams. The mixing is carried out for 20 minutes by dry mixing in a Waring Blendor.

The powder mixture is then vacuum compacted in a rubber sleeved canister suitable for subsequent hydrostatic pressing, and hydrostatically pressed at 30,000 p.s.i. to give a billet 1¾ inches in diameter by 2¾ inches in length having a density falling within the range of about 40% to 75% of full density. The compact is dehydrided and simultaneously sintered by heat treating at 50° F. in a vacuum of about 20 microns for about 90 hours. Because of the resulting increase in pressure due to the formation of hydrogen gas during the decomposition, the vacuum pump is maintained throughout the dehydriding treatment until the vacuum is restored to below 50 microns. The furnace is thereafter cooled to 100° F. and argon then introduced into the furnace chamber and the cooling continued to room temperature, after which the billet is removed and shaped to a cylinder of about 1¹³⁄₁₆ inches in diameter by 2¾ inches long weighing about 685 grams. The batches containing 7.5 v/o of alumina, having a total weight of about 820 grams, were similarly produced. In working with the dry box, the argon atmosphere had a water content of about 15.3±0.5 p.p.m. as water vapor.

Each of the billets produced after the combined sintering and dehydriding treatment generally has an as-sintered density falling within the range of about 55% to 85% of full density. Each of the billets are then placed in a can of deformable metal, preferably copper, using a protective atmosphere of an inert gas, such as helium. The can is sealed but provided with a vent to which a vacuum is applied during heating of the canned billet. The can is evacuated to a pressure of 0.01 micron and heated to an extrusion temperature of about 1150° F. The extrusion is carried out at a rate of about 35 inches per minute at an extrusion ratio of about 24 to 1. The extruded rod produced has a core diameter of about 0.355 inch.

The extruded products produced were designated as Alloy No. 1 (3.5 v/o alumina) and Alloy No. 2 (7.5 v/o alumina). The extruded products had the following densities and hardness compared to certain uranium alloys and unalloyed uranium as follows:

| Alloy No. | Density, Grams/cc. | Compositions | Hardness |
|---|---|---|---|
| 1 | 17.71±0.08 | 3.5 v/o $Al_2O_3$ | 36–38 Rc. |
| 2 | 16.56±0.02 | 7.5 v/o $Al_2O_3$ | 40–42 Rc. |
| U-Mo | | 3.5 Wt. percent Mo | 38–40 Rc. |
| U-Mo-Si | | 3.5 Wt. percent Mo, 0.5 Wt. percent Si. | 40–42 Rc. |
| U-Mo-Al | | 3.5 Wt. percent Mo, 0.1 Wt. percent Al. | 42–46 Rc. |
| U | | Unalloyed Uranium | 88–93 $R_B$. |

The stress-rupture properties of the dispersion hardened alloys were higher than the alloys having the higher hardness values. Electron micrographs taken of the dispersion hardened alloys at 5,000 and 15,000 magnification using direct replica techniques indicated that the extremely fine particle size of the alumina was maintained, that the dispersion was uniform and substantially free from stringering, and that the average interparticle spacing was substantially below 1 micron, for example below 0.5 micron.

Stress-rupture data were obtained on each of the compositions. The test bars employed were machined from the extruded rods and had a gauge section of 0.160 inch in diameter and 1.1 inches long. The machined specimens were polished with emery cloth following the machining operation. Rupture life data were obtained in Argon at 500° C. for Alloy Nos. 1 and 2 and 600° C. for Alloy No. 2. The results obtained were given in Table I as follows:

Table I

| Alloy No. | v/o $Al_2O_3$ | Temp., °C. | Stress, p.s.i. | Rupture Life, hrs. | Percent Elong. |
|---|---|---|---|---|---|
| 1 | 3.5 | 500 | 22,000 | 4.7 | 5.7 |
| 1 | 3.5 | 500 | 17,000 | 26.4 | 1.4 |
| 1 | 3.5 | 500 | 14,000 | 147.0 | 2.6 |
| 2 | 7.5 | 500 | 30,000 | 2.1 | 4.5 |
| 2 | 7.5 | 500 | 26,000 | 9.8 | 2.1 |
| 2 | 7.5 | 500 | 22,000 | 59.0 | 2.9 |
| 2 | 7.5 | 500 | 22,000 | 102.5 | 2.5 |
| 2 | 7.5 | 500 | 17,000 | 701.6 | |
| 2 | 7.5 | 600 | 17,000 | 10.2 | 2.3 |
| 2 | 7.5 | 600 | 15,000 | 48.6 | 2.6 |

Stress for 100 hour rupture determined from the foregoing data is given in Table II below:

Table II

| Alloy No. | v/o $Al_2O_3$ | Temp., °C. | Stress for 100 hour Rupture, p.s.i. |
|---|---|---|---|
| 1 | 3.5 | 500 | 15,000 |
| 2 | 7.5 | 500 | 22,000 |
| 3 | 7.5 | 600 | 13,500 |

Creep rate tests were conducted comparing Alloy Nos. 1 and 2 with USSR and AERE data for pure uranium presented at the Second Geneva Conference. The superiority of the U-Al$_2$O$_3$ alloys were clearly evident in the creep range of interest. For example, at a minimum creep rate of 10$^{-5}$ in./in./hr. at 500° C., Alloy No. 2 (7.5 v/o Al$_2$O$_3$) supports four times the stress of the USSR material (i.e. 17,000 p.s.i. versus 4,200 p.s.i.) and thirteen times the stress of the AERE material (17,000 p.s.i. versus 1,300 p.s.i.). The increase at 600° C. is even more pronounced due to the higher thermal stability of the dispersion strengthened alloy. At the same creep rate of 10$^{-5}$ in./in./hr., Alloy No. 2 supports ten times the stress of the USSR uranium (12,000 p.s.i. versus 1,200 p.s.i.).

Alloy No. 1 (3.5 v/o Al$_2$O$_3$) likewise shows a large increase in creep and rupture properties compared to pure uranium. Alloy No. 2 is about 30% stronger than No. 1 at a creep rate of 10$^{-5}$ in./in./hr. (17,000 p.s.i. versus 11,500 p.s.i.) at 500° C. Tests also indicated that over the creep range of 10$^{-5}$ to 10$^{-3}$ in./in./hr., Alloy No. 2 at 600° C. is capable of supporting 90% of the stress of Alloy No. 1 determined at 500° C. The dispersions in both alloys were ultra-fine.

The creep rupture properties of both alloys were superior to pure uranium at 500° C. by a factor of two to thirteen and at 600° C. by a factor of four to sixty over the creep range of 10$^{-3}$ to 10$^{-6}$ in./in./hr.

Broadly speaking, in producing the novel product provided by the invention, a given amount of the uranium hydride and the oxide dispersoid is blended uniformly under substantially non-oxidizing inert conditions and the mixture hydrostatically compacted at pressures of about 10 t.s.i. to 50 t.s.i. to produce a compact having a green density of at least about 40% of true density and ranging up to about 75%. The compact formed is then simultaneously sintered and dehydrided at an elevated dehydriding temperature, for example from about 400° C. to 600° C. in a vacuum for a time until substantially all of the hydrogen is removed as determined when the vacuum drops to below 50 microns of pressure. The sintered compact is then cooled to room temperature under inert conditions and the sintered compact then placed in a can of deformable metal, such as copper, mild steel, nickel, SAP (wrought sintered aluminum powder) or Zircaloy under inert conditions and the can thereafter vacuum sealed. The can and its contents are then extruded at an elevated temperature below the melting point of both the uranium and the material of the can, for example over the temperature range of about 500° C. to 650° C. at an extrusion ratio of at least 12 to 1 and, preferably, from about 16 to 1 to 35 to 1. Upon completion of the extrusion and upon cooling to room temperature, the outer skin of the can material is removed by machining, leaching or with suitable design, a cladded fuel element may be directly extruded by the technique of co-extrusion with such can materials as SAP, stainless or Zircaloy metals.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for producing dispersion hardened articles of wrought uranium while minimizing the formation of UO$_2$ the improvement comprising, providing a substantially uniform mixture of finely divided uranium hydride of particle size ranging up to about 15 microns with about 1 v/o to 15 v/o of a refractory oxide powder derived from a metal having a low microscopic thermal neutron cross section not exceeding about 125 barns and characterized by a negative free energy of formation of said oxide at about 25° C. of over 95,000 calories per gram atom of oxygen and an average particle size not exceeding about 0.3 micron, forming a porous billet of said matrix capable of being handled in subsequent metallurgical operations, simultaneously dehydriding and sintering said billet at an elevated dehydriding temperature under inert conditions, until substantially all of the hydride has been decomposed and substantially all of the hydrogen has been removed, and then hot working said billet under vacuum at an elevated hot working temperature.

2. In a method for producing dispersion hardened articles of wrought uranium while minimizing the formation of UO$_2$ the improvement comprising, providing a substantially uniform mixture of finely divided uranium hydride of particle size ranging up to about 15 microns with about 1 to 15 v/o of a refractory oxide powder derived from a metal having a low microscopic thermal neutron cross section not exceeding about 125 barns and characterized by a negative free energy of formation of said oxide at about 25° C. of over 95,000 calories per gram atom of oxygen and an average particle size not exceeding about 0.3 micron, cold compressing said mixture into a porous billet capable of being handled in subsequent metallurgical operations, simultaneously dehydriding and sintering said billet at an elevated dehydriding temperature under inert conditions until substantially all of the hydride has been decomposed and substantially all of the hydrogen has been removed, vacuum sealing said dehydrided billet in a deformable metal container, and then hot working said vacuum sealed container at an elevated hot working temperature.

3. In a method for producing dispersion hardened articles of wrought uranium while minimizing the formation of UO$_2$ the improvement comprising, providing a substantially uniform mixture of finely divided uranium hydride of particle size ranging up to about 15 microns with about 3 to 15 v/o of a refractory oxide power derived from a metal having a low microscopic thermal neutron cross section not exceeding about 125 barns and characterized by a negative free enery of formation of said oxide at about 25° C. of over 95,000 calories per gram atom of oxygen and an average particle size ranging from about 0.01 to 0.1 micron, cold compressing said mixture into a porous billet capable of being handled in subsequent metallurgical operations, simultaneously dehydriding and sintering said billet at an elevated dehydriding temperature under inert conditions until substantially all of the hydride has been decomposed and substantially all of the hydrogen has been removed, vacuum sealing said dehydrided billet in a deformable metal container, and then hot working said vacuum sealed contained at an elevated hot working temperature.

4. The method of claim 3 wherein said refractory oxide is alumina and wherein said billet is extruded.

5. In a method for producing dispersion hardened articles of wrought uranium while minimizing the formation of UO$_2$ the improvement comprising, providing a substantially uniform mixture of finely divided uranium hydride of particle size ranging up to about 5 microns with at least about 3 to 10 v/o of a refractory oxide powder derived from a metal having a low microscopic thermal neutron cross section not exceeding about 125 barns and characterized by a negative free energy of formation of said oxide at about 25° C. of over 95,000 calories per gram atom of oxygen and an average particle size ranging from about 0.01 to 0.1 micron, cold compressing said mixture into a porous billet capable of being handled in subsequent metallurgical operations, simultaneously dehydriding and sintering said billet at an elevated dehydriding temperature under inert conditions until substantially all of the hydride has been decomposed and substantially all of the hydrogen has been removed, vacuum sealing said dehydrided billet in a deformable metal container, and then hot extruding said vacuum sealed container at an elevated hot extrusion temperature.

6. The method of claim 5 wherein the refractory oxide is alumina.

(References on following page)

References Cited by the Examiner

UNITED STATES PATENTS

| | | | |
|---|---|---|---|
| 2,805,473 | 9/1957 | Handwerk et al. | 75—206 |
| 3,019,176 | 1/1962 | McReynolds et al. | 176—69 |
| 3,073,698 | 1/1963 | Arbiter | 75—206 |
| 3,121,047 | 2/1964 | Stoughton et al. | 176—69 |

FOREIGN PATENTS

| | | |
|---|---|---|
| 608,035 | 11/1960 | Canada. |

OTHER REFERENCES

AEC Document No. AECD–3665, "The Powder Metallurgy of Uranium," H. H. Hausner and J. L. Zambrow, 1955.

L. DEWAYNE RUTLEDGE, *Primary Examiner*.

REUBEN EPSTEIN, *Examiner*.

R. L. GOLDBERG, R. L. GRUDZIECKI,
*Assistant Examiners*.